2,865,763

FOOD COMPOSITION

Louis W. Ferrara, Franklin Park, Ill., assignor to International Minerals & Chemical Corporation, a corporation of New York No Drawing. Application February 27, 1957
Serial No. 642,685

6 Claims. (Cl. 99—144)

This invention relates to meat sauces and gravies. More particularly, it relates to an improvement in gravy compositions and to an additive for thickening, seasoning, and stabilizing gravy stocks.

In the preparation of gravies and other types of meat sauces, it is conventional to employ a fat-containing meat extract and to add starch thereto while stirring and heating. In this method, it is difficult to control the consistency of the product, the elimination of lumps is difficult if not impossible, and the product remains usable for only a short time, even under best conditions of preservation.

An object of the present invention is to prepare a meat sauce or gravy of smooth, uniform texture, controlled consistency, and long life under proper conditions of storage.

Another object is to provide an improved thickening and stabilizing agent for gravies.

Another object is to prepare an additive for gravies which simultaneously thickens, stabilizes, and improves the flavor thereof.

Another object is to provide a dry gravy base stock.

These and other objects of the invention will be apparent from the following description and claims.

I have discovered that an improved gravy can be produced by incorporating into a gravy base stock between about 1 and about 10% by weight of a phosphate-modified starch, as described hereinafter, and between about 0.05 and about 1% by weight or somewhat higher of monosodium glutamate, the proportions being on the basis of the completed mixture. Herbs or other seasonings may also be added in amounts as desired.

In one aspect, my invention is a gravy or other form of meat sauce having a composition as aforesaid.

In another aspect, my invention is a mixture of phosphate-modified starch, monosodium glutamate, and optional seasonings for incorporation into a gravy base stock to produce a gravy having the defined composition.

In another aspect, my invention is a dry gravy base stock, comprising dried meat extract, phosphate-modified starch, monosodium glutamate, and optional seasonings, capable of being converted into a gravy by adding edible oil and water thereto.

My new compositions employ the phosphate-modified starches of Hans Neukom, described in copending applications Serial No. 378,666, filed September 4, 1953, and Serial No. 456,621, filed September 16, 1954, as well as the high-viscosity variants thereof described by Sietsema and Trotter in application Serial No. 637,351, filed January 31, 1957. The Neukom starches (which are sometimes referred to herein for convenience simply as "starch phosphates") are prepared by heating a starch with certain phosphate salts at a temperature between about 120 and about 175° C. In one representative method, dry, ungelatinized starch is soaked in an aqueous solution of alkali-metal orthophosphate, excess surface moisture is removed for example by drying in the air or heating at a temperature below the point at which starch gelatinizes, for example at a temperature below about 45° C., depending upon the particular starch; and the resulting mixture, which generally contains between about 8% and about 15% moisture content, is heated for around 1 to 15 hours at about 130 to 170° C., preferably around 5 hours at about 160° C., the length of the heating period varying inversely with the temperature. The phosphate salt may suitably be a sodium, potassium, or lithium orthophosphate, alone or in appropriate combination to yield a pH in aqueous solution between about 4 and about 7, preferably around 6, measured at 25° C. at the concentration employed. The phosphate solution may suitably be between about 1 and about 3 molar in the phosphate salt, and should be used in a quantity sufficient to afford a bound phosphorus content of at least about 1% by weight, preferably between about 3 and about 5%, in the starch after heat treatment under the defined conditions. The heat-treated starch is readily dispersible in cold water, yielding a solution or a dispersion having a viscosity between about 1000 and about 5000 cp., measured in 5% aqueous solution at room temperature.

The Neukom starch phosphates may, if desired, be washed with methanol, ethanol, acetone, or other oxygen-containing water-miscible organic liquid to remove unbound phosphate salts. Alternatively, the Neukom starch phosphates can be dissolved in water to a concentration of around 1 to 15% by weight or higher, and a high-viscosity starch phosphate fraction or fractions can be precipitated therefrom by addition of about 35 to 65% by volume of methanol or other oxygen-containing water-miscible organic liquid according to the method of Sietsema and Trotter claimed in the copending patent application referred to above. The precipitated starch phosphate is filtered off and dried. Fractions having viscosities up to 100,000 cp. or higher at 5% concentration can be obtained in this way.

In a convenient embodiment, my invention is a composition comprising essentially a phosphate-modified starch and monosodium glutamate in a proportion between about 10:1 and about 50:1 by weight, preferably around 25:1, suitable for addition to meat gravies for thickening and stabilization thereof, and for intensifying or otherwise modifying the flavor. The composition may include one or more herbs or other seasoning materials.

In another embodiment, my invention is a smooth, stable gravy comprising essentially a gravy stock with between about 1 and about 10 weight-percent, preferably around 2 to 5 percent, of a phosphate-modified starch, and between about 0.05 and about 1 weight-percent, preferably around 0.2 to 0.4 percent, of monosodium glutamate. The proportion of starch phosphate is readily adjustable to yield a product of the desired consistency, and will vary inversely with the viscosity characteristics of the starch phosphate. A gravy of this type can satisfactorily be stored for an indefinite period in a frozen condition, and does not undergo "weeping" (separation of liquids and solids) on being thawed.

In an especially convenient and advantageous embodiment, my invention is a dry gravy base stock having essentially the following approximate composition:

| | Parts |
|---|---|
| Dried meat extract | 1 |
| Phosphate modified starch | 2 to 10 |
| Monosodium glutamate | 0.1 to 1 |

Such a stock is readily converted into a gravy by adding olive oil, peanut oil, cottonseed oil, or other edible oil, and water, milk, cream, evaporated milk, milk substitutes, or the like.

My invention is broadly useful in the preparation and modification of meat-based gravies, sauces, and the like, including compositions based upon beef, poultry, lamb, pork, venison, and the like, and extracts thereof.

The following specific examples will more fully illustrate the invention.

*Example 1*

A beef gravy illustrating my invention was prepared according to the following recipe:

| | |
|---|---|
| Starch phosphate | g  5 |
| Monosodium glutamate | g  0.5 |
| Spices | g  1.5 |
| Vegetable oil | ml  30 |
| Beef extract paste | g  1 |
| Water | ml  65 |

The starch phosphate, monosodium glutamate, and spices were mixed and blended with the oil. The beef extract was added and blended. Finally, the water was stirred in, and the completed mixture was heated to serving temperature. The product was a thick, smooth, brown gravy of pleasing flavor and texture.

A portion of beef gravy, prepared as described above, was frozen and kept in a freezer for approximately two months. On being thawed, no separation of liquid from solid phase ("weeping") was observed.

*Example 2*

A "cream" gravy was prepared according to the recipe of Example 1, using fresh whole milk instead of water. The product was a creamy-smooth semi-gel of appetizing flavor which remained stable during prolonged refrigeration.

*Example 3*

The following illustrates a dry gravy base stock which is readily converted into gravy by blending with around 30 parts of oil and around 90 parts of water or milk:

| | Grams |
|---|---|
| Starch phosphate | 100 |
| Monosodium glutamate | 7 |
| Spices | 15 |
| Dried meat extract | 20 |

*Example 4*

The following illustrates a gravy thickener and flavoring agent, prepared in accordance with my invention, for addition to gravy stocks in the proportion of about 1 to about 5% by weight:

| | Grams |
|---|---|
| Starch phosphate | 100 |
| Monosodium glutamate | 10 |
| Spices | 40 |

While I have described my invention by reference to certain specific materials, combinations of materials, and operating examples, it is to be understood that such matters are illustrative only and not by way of limitation. Numerous modifications and equivalents of the invention will be apparent from the foregoing description to those skilled in the art.

In accordance with the foregoing description, I claim as my invention:

1. A composition suitable for thickening and stabilizing gravies and for modifying the flavor thereof which comprises essentially a phosphate-modified starch and monosodium glutamate in a proportion between about 10:1 and about 50:1 by weight, said phosphate-modified starch having been prepared by soaking dry, ungelatinized starch in an aqueous solution containing an orthophosphate salt of an alkali metal and having a pH between about 4 and about 7, removing excess surface moisture from the soaked starch at a temperature below that at which the starch gelatinizes, and heating the starch for about 1 to about 15 hours at a temperature between about 120° C. and about 175° C., the length of the heating period varying inversely with the temperature.

2. A composition suitable for thickening and stabilizing gravies and for modifying the flavor thereof which comprises essentially a phosphate-modified starch and monosodium glutamate in a proportion around 25:1 by weight, said phosphate-modified starch having been prepared by soaking dry, ungelatinized starch in an aqueous solution of sodium orthophosphate, said solution having a pH between about 4 and about 7, removing excess surface moisture from the soaked starch at a temperature below that at which the starch gelatinizes, and heating the starch for about 1 to about 15 hours at a temperature between about 120° C. and about 175° C., the length of the heating period varying inversely with the temperature.

3. A thickening, stabilizing, and flavoring agent for gravies which comprises essentially a phosphate-modified starch and monosodium glutamate in a weight ratio between about 10:1 and about 50:1, and a seasoning material, said phosphate-modified starch having been prepared by soaking dry, ungelatinized starch in an aqueous solution of sodium orthophosphate, said solution having a pH between about 4 and about 7, removing excess surface moisture from the soaked starch at a temperature below that at which the starch gelatinizes, and heating the starch for about 1 to about 15 hours at a temperature between about 120° C. and about 175° C., the length of the heating period varying inversely with the temperature.

4. A smooth, stable gravy comprising essentially a gravy stock, between about 1 and about 10 weight-percent of a phosphate-modified starch, and between about 0.05 and about 1 weight-percent of monosodium glutamate, said phosphate-modified starch having been prepared by soaking dry, ungelatinized starch in an aqueous solution of sodium orthophosphate, said solution having a pH between about 4 and about 7, removing excess surface moisture from the soaked starch at a temperature below that at which the starch gelatinizes, and heating the starch for about 1 to about 15 hours at a temperature between about 120° C. and about 175° C., the length of the heating period varying inversely with the temperature.

5. A smooth, stable gravy comprising essentially a gravy stock, between about 2 and about 5 weight-percent of a phosphate-modified starch, between about 0.2 and about 0.4 weight-percent of monosodium glutamate, and a seasoning material, said phosphate-modified starch having been prepared by soaking dry, ungelatinized starch in an aqueous solution of sodium orthophosphate, said solution having a pH between about 4 and about 7, removing excess surface moisture from the treated starch to a moisture content below about 15% at a temperature below that at which the starch gelatinizes, and heating the starch about 1 to about 15 hours at a temperature between about 130° C. and about 170° C., the length of the heating period varying inversely with the temperature.

6. A dry gravy base stock having essentially the following approximate composition:

| | Parts |
|---|---|
| Dried meat extract | 1 |
| Phosphate-modified starch | 2 to 10 |
| Monosodium glutamate | 0.1 to 1 | said phosphate-modified starch having been prepared by soaking dry, ungelatinized starch in an aqueous solution of sodium orthophosphate, said solution having a pH between about 4 and about 7, removing excess surface moisture from the treated starch to a moisture content below about 15% at a temperature below that at which the starch gelatinizes, and heating the starch about 1 to about 15 hours at a temperature between about 130° C.

and about 170° C., the length of the heating period varying inversely with the temperature.

References Cited in the file of this patent

UNITED STATES PATENTS

| | | |
|---|---|---|
| 1,193,739 | Till | Aug. 8, 1916 |
| 1,680,865 | Fujii | Aug. 14, 1928 |
| 1,992,462 | Barnett | Feb. 26, 1935 |
| 2,257,599 | Frischmuth et al. | Sept. 30, 1941 |
| 2,270,582 | Esselen | Jan. 20, 1942 |
| 2,314,459 | Salzburg | Mar. 23, 1943 |
| 2,500,919 | Cahn | Mar. 21, 1950 |
| 2,590,912 | Yarber | Apr. 1, 1952 |